US011342546B2

United States Patent
Moganty et al.

(10) Patent No.: US 11,342,546 B2
(45) Date of Patent: May 24, 2022

(54) METHOD OF INFUSING SULFUR AND RESULTING COMPOSITION

(71) Applicant: NOHMS Technologies, Inc., Rochester, NY (US)

(72) Inventors: Surya Moganty, Henrietta, NY (US); Rutvik Vaidya, Rochester, NY (US); Xiaojing Zhu, Rochester, NY (US); Gabriel Torres, Rochester, NY (US)

(73) Assignee: NOHMS Technologies, Inc., Rochester, NY (US)

( * ) Notice: Subject to any disclaimer, the term of this patent is extended or adjusted under 35 U.S.C. 154(b) by 0 days.

(21) Appl. No.: 16/809,733

(22) Filed: Mar. 5, 2020

(65) Prior Publication Data
US 2021/0280847 A1    Sep. 9, 2021

(51) Int. Cl.
| | |
|---|---|
| *H01M 4/04* | (2006.01) |
| *H01M 4/36* | (2006.01) |
| *H01M 4/38* | (2006.01) |
| *H01M 4/587* | (2010.01) |
| *H01M 10/052* | (2010.01) |
| *C08K 3/06* | (2006.01) |
| *C08K 3/00* | (2018.01) |
| *H01M 4/58* | (2010.01) |
| *H01M 4/62* | (2006.01) |

(Continued)

(52) U.S. Cl.
CPC ............. *H01M 4/0471* (2013.01); *C08K 3/00* (2013.01); *C08K 3/06* (2013.01); *H01M 4/1397* (2013.01); *H01M 4/364* (2013.01); *H01M 4/38* (2013.01); *H01M 4/58* (2013.01); *H01M 4/587* (2013.01); *H01M 4/5815* (2013.01); *H01M 4/625* (2013.01); *H01M 10/052* (2013.01); *C08K 3/02* (2013.01); *C08K 3/04* (2013.01); *C08K 3/041* (2017.05); *C08K 3/042* (2017.05); *C08K 3/046* (2017.05); *H01M 2004/028* (2013.01); *Y02E 60/10* (2013.01)

(58) Field of Classification Search
None
See application file for complete search history.

(56) References Cited

U.S. PATENT DOCUMENTS

| | | | | |
|---|---|---|---|---|
| 5,672,316 A | * | 9/1997 | Knapp | ........................ B01J 3/04 422/21 |
| 2004/0241532 A1 | * | 12/2004 | Kim | ........................ B82Y 30/00 429/517 |

(Continued)

FOREIGN PATENT DOCUMENTS

| | | | |
|---|---|---|---|
| CN | 103560232 A | * | 2/2014 |
| JP | 2017-119620 A | | 6/2017 |

OTHER PUBLICATIONS

Zhu et al. "Microwave assisted preparation of expanded graphite/sulfur composites as cathodes for Li—S batteries", New Carbon Materials, 2016, 31(2): 199-204; PDF copy attached. (Year: 2016).*

(Continued)

*Primary Examiner* — Katie L. Hammer
(74) *Attorney, Agent, or Firm* — Bond Schoeneck & King, PLLC; Joseph M. Noto

(57) ABSTRACT

A method utilizing microwave energy to incorporate sulfur onto carbon, prepare cathode material for lithium sulfur battery applications, and the compositions resulting therefrom is disclosed.

8 Claims, 4 Drawing Sheets

(51) Int. Cl.
*H01M 4/1397* (2010.01)
*C08K 3/04* (2006.01)
*C08K 3/02* (2006.01)
*H01M 4/02* (2006.01)

(56) References Cited

U.S. PATENT DOCUMENTS

| | | | | |
|---|---|---|---|---|
| 2014/0186695 A1* | 7/2014 | Moganty | ............... | H01M 4/136 |
| | | | | 429/188 |
| 2015/0303454 A1* | 10/2015 | Otter | ..................... | H01M 4/583 |
| | | | | 252/182.1 |
| 2019/0245203 A1* | 8/2019 | Cho | ......................... | C01B 32/00 |
| 2020/0274154 A1* | 8/2020 | Kim | ..................... | H01M 4/362 |

OTHER PUBLICATIONS

English text machine translation of Yang et al. (CN 103560232 A); PDF accessed online from Espacenet (Year: 2014).*

International Search Report and Written Opinion for International Application No. PCT/US2020/020911 dated May 29, 2020.

Chen, D. et al., "One-pot fabrication of nitrogen and sulfur dual-doped graphene/sulfur cathode via microwave assisted method for long cycle-life lithium-sulfur batteries", Journal of Alloys and Compounds 746, Publication Feb. 23, 2018, pp. 116-124.

Wang, D. et al. "A microporous-mesoporous carbon with graphitic structure for a high-rate stable sulfur cathode in carbonate solvent-based Li—S batteries", Physical Chemistry Chemical Physics, Pulication Apr. 26, 2012, pp. 8703-8710.

\* cited by examiner

METHOD OF INFUSING SULFUR AND RESULTING COMPOSITION

FIELD

The present disclosure generally relates to the field of electrochemical cells. More particularly, this disclosure relates to a method of condensing sulfur onto a carbon material, and the composition resulting therefrom.

BACKGROUND

The disclosures of the publications, patents, and published patent specifications referenced in this application are hereby incorporated by reference into the present disclosure to more fully describe the state of the art to which this disclosure pertains.

Microwave irradiation as an energy source for carrying out reactions has attracted attention since the mid-1980s, when increased reaction rates were observed compared with conventional heating methods. See, S A. Galema, Microwave Chemistry, Chemical Society Review, 26, 1997. Since then, microwave irradiation has been shown to have many advantages: not only drastically decreased processing times, but also increased yields and improved performance. In addition, this method is particularly attractive for scale-up processes, as the direct heating of reactants by microwave irradiation provides a more uniform environment as opposed to conventional heating methods. See, Luo, X. Hu, Y. Sun, Y. Huang, App. Mat and Interfaces, 2013, 5, 1997, and L. Noerochim, J. Z, Wang, D. Wexxler, Z. Chaao, H. K. liu, J. of Power Sources, 2013, 228, 198.

Due to the benefits of materials processing by microwave irradiation, this method has been explored as an efficient means of synthesizing various materials used in Li-ion batteries. Luo and associates have demonstrated a microwave process to synthesize molybdenum oxide nanoparticles encapsulated in an interconnected mesoporous carbon network for use as an anode in a Li-ion system. See, Luo, ibid. More recently, Noerochim et al. have shown microwave synthesis of molybdenum trioxide using a hydrothermal method for use as bendable cathode for lithium batteries. See, L. Noerchim, ibid. Gao et al. has previously synthesized $LiV_3O_8$ and $Li_3V_2(PO_4)_3$ successfully using a microwave-assisted method, and lately, $LiNi_{0.5}Mn_{1.5}O_4$. It is of interest that $LiNi_{0.5}Mn_{1.5}O_4$ prepared via microwave irradiation for 7 minutes exhibited preferential growth behavior at an accelerated rate, as well as better capacity at a high current rate, than $LiNi_{0.5}Mn_{1.5}O_4$ prepared using a conventional method of heating for 48 hours. See, Gao, L. Wang, L. Chen, X. Jiang, J. Pinto, G. Yang, Electrochim. Acta, 2013, 100, 125.

In addition, it has been shown that microwave irradiation is an effective means for carbon activation for electrochemical capacitor applications. See, S. E. Chun, J. F. Whitacre, J. of Power Sources, 2013, 240, 306.

Among cathode materials for secondary lithium batteries, elemental sulfur has a very high theoretical capacity, 1672 $mAhg^{-1}$ against lithium, which is considerably greater than that of many commercially used transition metal phosphates and transition metal oxides. In addition, elemental sulfur also provides several other advantages as a cathode material for a secondary lithium battery, including in particular low cost and widespread availability. Sulfur has consequently been studied extensively as a cathode material for secondary lithium batteries and is considered a promising candidate for a cathode material for secondary lithium batteries that may be used in electric and hybrid electric vehicles.

Despite this promise, implementation of Li—S secondary battery systems for high power applications has been problematic for various reasons. For one, sulfur by itself has relatively low electrical conductivity. Thus, desirable are methods and materials that provide an opportunity to fully realize the advantages of sulfur as a cathode material within a Li—S secondary battery system.

While lithium sulfur (Li—S) cathode material has long enjoyed a significant (10x) specific capacity advantage over current lithium-ion batteries, Li—S chemistries have been impractical due to poor cycle life and a high rate of discharge. The polysulfide shuttling reaction between sulfur and its lithiated compounds has limited the development of batteries based on the Li—S chemistry because the reaction leads to irreversible material losses in the battery that reduces energy storage capacity over time. Shuttling is a cyclic process in which long-chain lithium polysulfides, ($Li_2S_n$, $2<n<8$), generated at the cathode during charging, dissolve into the electrolyte and migrate to the anode by diffusion where they react with the lithium electrode in a parasitic fashion to generate lower-order polysulfides, which diffuse back to the sulfur cathode and regenerate the higher forms of polysulfide. Since this polysulfide shuttling or dissolution takes place at the expense of the available electroactive sulfur species, the reversibility of sulfur and/or sulfide is broadly considered a major technical barrier towards commercialization of high-energy Li—S batteries. Another limitation is elemental sulfur is a poor electrical conductor (with a conductivity $\approx 5 \times 10^{-30}$ S $cm^{-1}$ at 25° C.), which has limited the rate at which a conventional Li—S battery can be discharged/charged.

Thus, there remains a need for sulfur-containing cathode materials for lithium secondary cell with improved conductivity and cycle life.

SUMMARY

In accordance with an aspect of the present disclosure, there is provided a method of forming a carbon/sulfur composite, including:

a) placing a carbon/sulfur mixture into a reactor vessel;

b) placing the reactor vessel in a microwave oven;

c) subjecting the carbon/sulfur mixture to a microwave heat source;

d) raising the temperature of the carbon/sulfur mixture to above the melting point of sulfur; and e) lowering the temperature of the carbon/sulfur mixture to below the melting point of sulfur, forming a carbon/sulfur composite having sulfur condensed onto the carbon.

These and other aspects of the present disclosure will become apparent upon a review of the following detailed description and the claims appended thereto.

DETAILED DESCRIPTION

Figure 1:
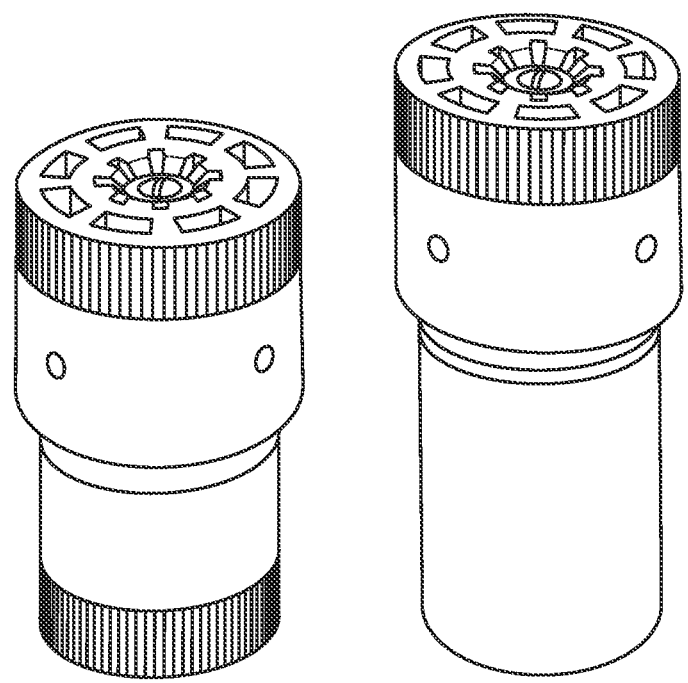
FIG. 1 is a picture of a pair of sulfur infusion microwave reactors of different sizes.

Before describing several exemplary embodiments of the disclosure, it is to be understood that the subject matter is not limited to the details of construction or process steps set forth in the following description. The disclosure is capable of other embodiments and of being practiced or being carried out in various ways.

The use of the terms "a" and "an" and "the" and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Carbon has the tendency to absorb microwave radiation which is translated into heat even without the presence of any polar solvent. See, H. M. Kingston, S. J. Haswell, Microwave Enhanced Chemistry: Fundamentals, Sample Preparation and Application, ACS, Washington D.C. Thus, materials with carbon coating or physical mixing are heated efficaciously by microwave irradiation as compared to conventional heating. In this regard, a successfully synthesized sulfur infused carbon composite using microwave irradiation of the physical carbon/sulfur mixture is disclosed. Microwave irradiation has not believed to have been previously investigated as a method for preparing lithium sulfur battery materials despite its successes in preparing varied materials for other battery chemistries.

It is believed that the best conventional methods of sulfur infusion reported or followed require high temperatures at 550° C. for 4 hours, plus additional time for heat ramping and cooling of the reaction vessel. Moreover, these conventional methods require a specially designed pressure vessel for this process since the infusion is done at elevated temperature. For example, for batches of a half-kilogram scale, the complete heating and cooling conventional process can take up to 16 hours or more, which is a clear barrier for efficient large-scale processing. Disclosed methods use microwave radiation for incorporating sulfur into a cathode material for lithium sulfur battery applications.

Sulfur condensed on the carbon host using microwave irradiation results in improved scalability, economic viability, reduced time and efficiency. Microwave irradiation according to the present process provides the benefit of more rapid infusion, decreased heat ramping, increased thermal efficiency, and greater product consistency for scale-up. Thus, materials with carbon coating or physical mixing are heated more efficaciously by microwave irradiation than by conventional methods. In this regard, a sulfur infused carbon composite in accordance with the present process has been successfully synthesized using microwave irradiation of the physical carbon/sulfur mix. Microwave irradiation has not believed to have been previously investigated as a method for preparing lithium sulfur battery materials despite its successes in preparing varied materials for other battery chemistries.

The disclosure relates to a method of condensing sulfur onto a carbon material, for example a carbon cathode for lithium sulfur battery application, thorough the use of a microwave source. An embodiment of the process includes placing a carbon/sulfur mixture into a reactor vessel; placing the reactor vessel in a microwave oven; subjecting the carbon/sulfur mixture to a microwave heat source; raising the temperature of the carbon/sulfur mixture to above the melting point of sulfur; and lowering the temperature of the carbon/sulfur mixture to below the melting point of sulfur, forming a carbon/sulfur composite wherein the sulfur is condensed onto the carbon.

Suitable carbon/sulfur composites include sulfur in an amount of from 60 wt. % to 95 wt. % and carbon in an amount of from 5 wt. % to 40 wt. %.

Suitable carbon and carbon-containing materials in the carbon/sulfur mixture include carbon black, graphite, carbon fiber, carbon nanotube, fullerene, graphene, graphene oxide, activated carbons, pyrolytic carbons, polymer-derived carbons and combinations thereof.

Suitable sulfur and sulfur-containing materials in the carbon/sulfur mixture include elemental sulfur, sulfides, disulfides and combinations thereof.

Suitable apparatus used for microwave infusion reaction of the present disclosure can be made of any microwave safe materials. In an embodiment, the reactor is a covered vessel of microwave safe materials, which include ceramic, glass, plastic, or other suitable materials.

In an embodiment, the reactor includes a microwavable vessel with a threaded cover. Care should be taken to clean the threads of the reactor as even a trace amount of carbon upon irradiation with microwave can heat up and jam the reactor from opening. The microwave reactor containing the carbon/sulfur mixture is placed in the microwave oven. A conventional microwave oven can be used. In an embodiment, microwave emitting sources with a power of 500 to 1500 watts is effective for use in the infusion process. In further embodiments, microwave emitting sources with a power of from 750 to 1250 watts is effective for use in the infusion process. In some embodiments, microwave ovens with a power of 1000 watts can be used for the infusion process.

Irradiation of the vessel to condense sulfur onto the carbon material takes place at such time as is required to complete the infusion process. This is dependent on the power capacity of the microwave source. For example, the samples were successfully irradiated at 1000 watts for 35 seconds.

The time required for infusion was optimized using a conventional glass tube reactor. When carbon was irradiated with microwave, it will heat up to a temperature ranging from few hundred to more than 2000° C. for a short time, usually in fraction of seconds, which will help to sublimate the sulfur species. Since the reactor is a closed pressure reactor, the pressure inside the reactor will force the sulfur vapor to condense onto the carbon. It is also possible to increase the infusion time, for a desired extended duration infusion, simply by reducing the oven power to $\frac{1}{5}^{th}$ or $\frac{1}{10}^{th}$ based on the requirement.

In an embodiment, the sulfur infuses into the carbon in the carbon/sulfur composite. In an embodiment, the carbon is a carbon matrix that enables the sulfur to be incorporated therein. In an embodiment, the sulfur infuses into the pores of the carbon. In an embodiment, the carbon is carbon black. In an embodiment, the carbon is a carbon black composite. In an embodiment, the carbon is a carbon cathode composite.

The disclosure will be further illustrated with reference to the following specific example. It is understood that this example is given by way of illustration and is not meant to limit the disclosure or the claims to follow.

Example

To perform the microwave infusion of sulfur onto the carbon material, a mixture of 3 grams of carbon blended with 7 grams of sulfur in the desired ratio of 3:7 was taken in a microwave reactor shown in FIG. 1. The microwave reactor containing the carbon/sulfur mixture was placed in a microwave oven.

Figure 2:
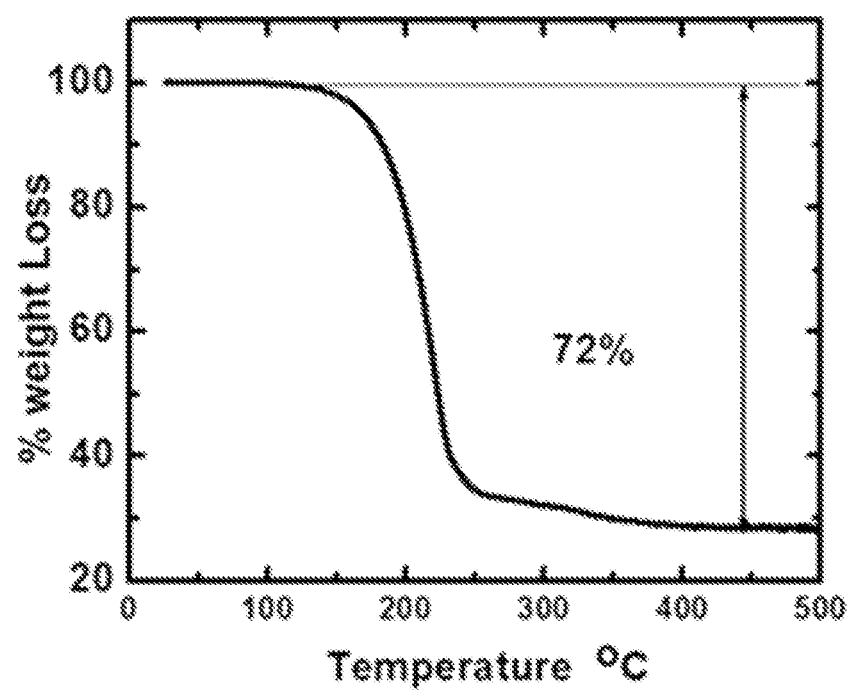
FIG. 2 is a TGA plot showing the presence of 72% of sulfur in the microwave infused carbon/sulfur composite prepared in accordance with the Example.

The thermogravimetric analysis (TGA) data shown in FIG. 2 shows the presence of 72% of sulfur in the microwave irradiated cathode composite, which is desirable and well within the conductive region of the composite.

Figure 3:
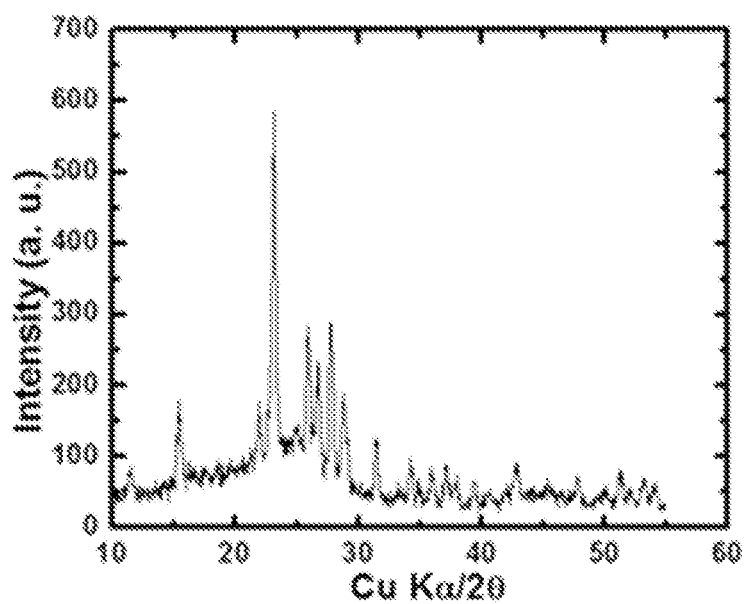
FIG. 3 is an XRD plot showing the highly crystalline nature of sulfur in the microwave infused carbon/sulfur composite prepared in accordance with the Example.

FIG. 3 shows the x-ray diffraction (XRD) pattern of the sulfur carbon composite infused at 100% power for 35 seconds. The peaks in the XRD pattern displays highly crystalline nature of the composite, were as it should have been amorphous as noticed in the XRD pattern (not shown) of the same composite sulfur infused using a conventional method. This may be attributed to the high temperature heating process induced by the microwave irradiation upon carbon. This behavior is predictable, as high temperature heating of any material will alter the amorphous nature to highly crystalline.

Figure 4A:
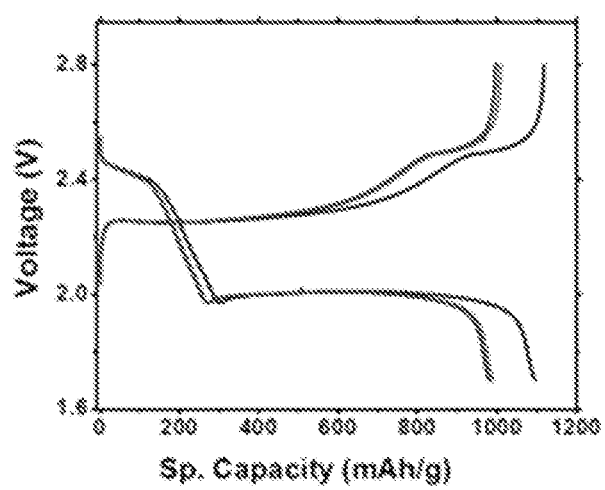
FIG. 4A is a graph of voltage vs. capacity profile
Figure 4B:
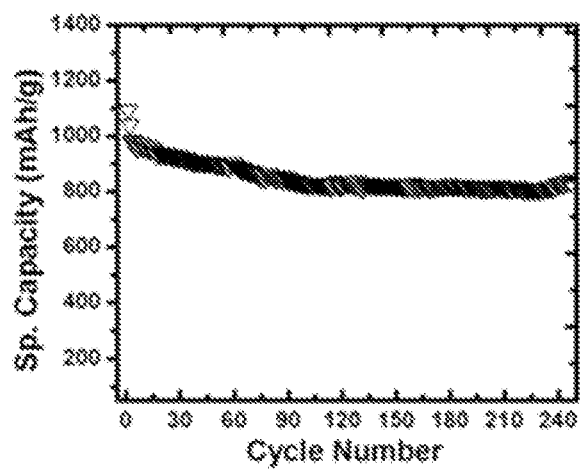
FIG. 4B is a graph of the cycle life behavior of the carbon/sulfur composite prepared in accordance with the Example.

FIGS. 4A and 4B show the electrochemical charge discharge behavior of the Li—S battery assembled using the microwave infused sulfur carbon composite. A charge and discharge test was performed in order to investigate the changes of the electrochemical properties of the Li—S battery with the synthesized composite cathode under the cell voltage of 3.0-1.7 V at 0.5 C rate against lithium metal anode.

FIG. 4A displays the voltage vs. capacity plot of the Li—S battery at room temperature. An initial discharge capacity of 1091 mAh/g was observed for the Li—S battery with the discharge/charge plateaus reflecting the reversible formation of various products starting from the elemental sulfur to Li$_2$S. The multiple discharge/charge voltage plateaus seen in FIG. 4A were in good agreement with the previously reported studies. Additionally, no changes in the voltage plateaus are seen even after 240 cycles indicating that the electrochemical processes are substantially unchanged during extended cycling of the cell, which is highly desirable for battery applications.

FIG. 4A is a typical voltage vs. capacity profile and FIG. 4B is a cycle life behavior of the carbon sulfur composite. The cell is discharged and charged at 0.5 C-rate. The capacity is reported here in terms of the percentage (72%) of the sulfur active mass. The cycle life plot of the carbon sulfur composite containing 72% of sulfur was shown in FIG. 4B. Strong cycling stability was observed at 0.5 C rate of discharge/charge for more than 240 cycles. Herein, the current rate is based on the theoretical capacity of sulfur and the capacity is reported in terms of the percentage of the sulfur active mass present in the composite, which is 72%. The carbon/sulfur composite maintained a very stable capacity above 800 mAh/g for 240 cycles and subsequently reduced to 795 mAh/g at the end of 240 cycles.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A method of forming a carbon/sulfur composite, comprising:
    a) placing a porous carbon/sulfur mixture into a closed pressure reactor vessel;
    b) placing the closed pressure reactor vessel in a microwave oven;
    c) subjecting the porous carbon/sulfur mixture to a microwave heat source;
    d) raising the temperature to a few hundred ° C. by subjecting the porous carbon/sulfur mixture to a microwave power of at least 500 Watts for a sufficient time to vaporize the sulfur and bind the sulfur to the carbon; and
    e) lowering the temperature of the porous carbon and sulfur vapor to below the melting point of sulfur, thereby condensing sulfur vapor inside pores of the porous carbon and forming a carbon/sulfur composite containing sulfur bound to carbon.

2. The method of claim 1, wherein the carbon/sulfur composite is a lithium sulfur battery carbon electrode.

3. The method of claim 1, wherein the sulfur in the carbon/sulfur mixture is elemental sulfur, sulfide, disulfide or a sulfur-containing compound.

4. The method of claim 1, wherein the carbon in the carbon/sulfur mixture is a carbon-containing material.

5. The method of claim 1 wherein the carbon in the carbon/sulfur mixture is carbon black, graphite, carbon fiber, carbon nanotube, fullerene, graphene, graphene oxide, activated carbon, pyrolytic carbon, polymer-derived carbon or combinations thereof.

6. The method of claim 1, wherein the temperature of the porous carbon/sulfur mixture is heated up to a temperature ranging from a few hundred to more than 2000° C.

7. The method of claim 1, wherein the carbon/sulfur composite comprises sulfur in an amount of from 60 wt. % to 95 wt. %.

8. The method of claim 1, wherein the carbon/sulfur composite comprises carbon in an amount of from 5 wt. % to 40 wt. %.

* * * * *